United States Patent [19]

Brogdon

[11] Patent Number: 4,787,271
[45] Date of Patent: Nov. 29, 1988

[54] GEAR BOX

[75] Inventor: J. William Brogdon, Daphne, Ala.

[73] Assignee: Teledyne Industries, Inc., Los Angeles, Calif.

[21] Appl. No.: 29,197

[22] Filed: Mar. 23, 1987

[51] Int. Cl.[4] .................. F16H 3/44; F16H 37/06; F16H 57/04; F01M 9/10
[52] U.S. Cl. .................. 74/781 R; 74/686; 74/467; 184/6.12
[58] Field of Search ............ 74/781 R, 467, 686; 184/6.12, 39.1; 60/593

[56] References Cited

U.S. PATENT DOCUMENTS

| | | | |
|---|---|---|---|
| 2,215,671 | 10/1938 | Swennes | 74/781 R |
| 2,968,190 | 2/1958 | Orr | 74/467 |
| 3,097,546 | 7/1963 | Kelbel et al. | 74/467 |
| 3,149,504 | 9/1964 | Brickett | 74/606 R |
| 3,489,034 | 1/1970 | Moore | 74/606 R |
| 3,800,913 | 4/1974 | Schmidt | 74/606 R |
| 4,368,802 | 1/1983 | Grabill et al. | 74/467 X |
| 4,411,171 | 10/1983 | Fiala | 74/686 X |
| 4,483,144 | 11/1984 | Steffes | 60/566 X |
| 4,516,444 | 5/1985 | Herr, Jr. | 74/781 R |
| 4,583,416 | 4/1986 | Müller | 74/467 |
| 4,649,771 | 3/1987 | Atkinson et al. | 74/781 R |
| 4,659,294 | 4/1987 | Barthomeuf | 91/297 X |
| 4,706,520 | 11/1987 | Sivalingam | 74/781 R |
| 4,730,514 | 3/1988 | Shikata et al. | 74/467 |

FOREIGN PATENT DOCUMENTS

| | | | |
|---|---|---|---|
| 760370 | 5/1953 | Fed. Rep. of Germany | 74/686 |
| 0026665 | 2/1984 | Japan | 184/6.12 |

Primary Examiner—Dirk Wright
Assistant Examiner—Harold F. Macris
Attorney, Agent, or Firm—Gifford, Groh, Sheridan, Sprinkle and Dolgorukov

[57] ABSTRACT

A two speed gear box employs a planetary gear mechanism in which the planet carrier is in the form of a pinion gear which drives the second stage of the gear box. The gear box includes hydraulically actuated clutches which, in high gear, selectively lock the sun gear for rotation with the input shaft, and, in low gear, selectively lock the sun gear with respect to the housing so that the carrier pinion is driven at the speed with which the axes of the planet gears rotate about the sun gear. The annular gear includes an outwardly extending gear rack adapted to engage a generator driving mechanism. Pressurized fluid lubricant is provided to the generator housing and to the interior of the gear box housing. Expelled generator lubricant, still at relatively high pressure, powers an ejector to positively scavenge the fluid out of the gear box and return it to a cooling reservoir obviating the need for a separate scavenging pump. Low pressure fluid is pressure amplified and accumulated until needed for actuation of the hydraulic clutches which uses less energy than a pump under conditions of infrequent shifting.

15 Claims, 2 Drawing Sheets

GEAR BOX

BACKGROUND OF THE INVENTION

I. Field of the Invention

The present invention relates generally to gear boxes with means for adjusting the rotary speed with which its output shaft is driven and, more particularly, to a gear box having a planetary gear mechanism in which the planet gear carrier itself forms a gear, to drive a second stage gear, and wherein the gear box includes hydraulically actuated clutches driven by a hydraulic amplifier.

II. Description of the Prior Art

There are many known forms of gear boxes for drive trains connecting power from a motor such as an internal combustion engine to drive wheels of a vehicle, an airplane propeller, industrial machines and the like. However, reduction of the size and weight of the power train used in an aircraft is particularly important to the optimum efficiency and performance of the aircraft. As a result, many known drive trains are inappropriate for use in aircraft.

Gear boxes often provide not only speed reduction, but also variability of the speed at which the output shaft is driven. One known form of a gear box for generating the desired output speed comprises a planetary gear system. In such a system, a plurality of planet gears are engaged between an outer ring gear and a sun gear, and the axes of the planet gears are tied together by a carrier or cage. The difference between the speeds at which the carrier and the ring gear rotate is used to advantage in varying the speed of the output shaft of the gear box. Clutches are used to selectively lock one gear set with respect to another to vary the rotary output speed ratio.

In addition, since the numerous gears in a planetary system must be lubricated, a pressurized flow of lubricant is often used to distribute the lubrication throughout the gear box housing. Typically, the pressure is generated by a high pressure pump which is driven by the motor used to drive the gear box. A separate scavenge pump circulates lubricant from the gear box back to a reservoir. The scavenge pump further increases the weight and size of the drive train.

Another feature which inhibits minimizing the size and weight of a gear box is the fact that the planet gear carrier is also formed separately from the driving components of the gear system and thus, substantially increases the length and weight of the planetary gear arrangement.

In addition, when clutches are used to selectively lock specific gears to vary the rotary output speed ratio, the clutch actuating system also adds substantially to the bulk and size of the gear box housing. Typically, hydraulically actuated clutches are used, and thus require a source of highly pressurized fluid to actuate the clutches. High pressure fluid is usually generated by a separate pump which is driven continuously by the motor. This arrangement further reduces the power available to operate the gear box, and adds to the weight and size of the drive train.

SUMMARY OF THE PRESENT INVENTION

The present invention overcomes the above mentioned disadvantages by providing a compact, lightweight gear box having a planetary gear system which includes hydraulically actuated clutches and a novel means for generating the high pressure operating fluid from a lower pressure source. One particular advantage of a gear box of the present invention is that the planet carrier is in the form of a pinion gear which forms the drive gear for the second or output stage of the gear box. Thus, the present invention avoids the disadvantages of the previously known carrier constructions which require a mechanical connection of the planet carrier and the second stage of the gear box.

Moreover, the present invention avoids the need for a continuously driven pump to generate the highly pressurized fluid used to actuate the hydraulic clutches. In the present invention, a hydraulic amplifier coupled to a source of low pressure fluid amplifies the pressure, and the pressurized fluid is delivered to and stored in an accumulator. Once the accumulator has been filled, there is no continuous power drain on the system. Only when the clutches have been actuated does the pressure need to be built up again in the amplifier and be delivered to the accumulator for storage and later use. As a result, under conditions of infrequent shifting, the gear box of the present invention provides substantially more efficient use of engine power than the previously known gear boxes having separate high pressure pumps for hydraulically controlling clutch plates for speed ratio selection.

In addition, an ejector utilizing a venturi effect scavanges lubricating and cooling oil from the gear box toward a reservoir. Since the drop in oil pressure across some components, such as a generator, is minimal, a source of relatively high pressure oil is available. This high pressure oil is used to power an ejector which scavenges lubricating and cooling oil from the gear box to a reservoir. The need for a dedicated scavenge pump is thereby eliminated, which substantially decreases the weight and power consumption of the gear box.

In the preferred embodiment, the gear box is a two speed gear box. The high gear clutch is spring loaded to its engaged position so that the gear box is normally at its high speed ratio. The application of hydraulic pressure to the clutch mechanism disengages the sun gear from the input ring gear and holds it stationary to the housing. As a result, the pinion gear forming the planet carrier rotates about the sun gear, thus driving the second stage of the gear box at a lower speed.

Thus, the gear box of the present invention is substantially lighter and more compact than previously known two speed gear boxes. Moreover, the gear box is adapted to receive lubrication from the existing engine lubrication system. Although it functions substantially similarly to a dry sump type of gear box, a positive return flow of oil to the oil reservoir is provided by an ejector rather than a power consuming scavenge pump. Furthermore, the clutch mechanism provides the advantages of high pressure hydraulic clutch actuation without the need for a separate continuously driven high pressure pump, and is particularly well adapted for use where clutch actuation is infrequent.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
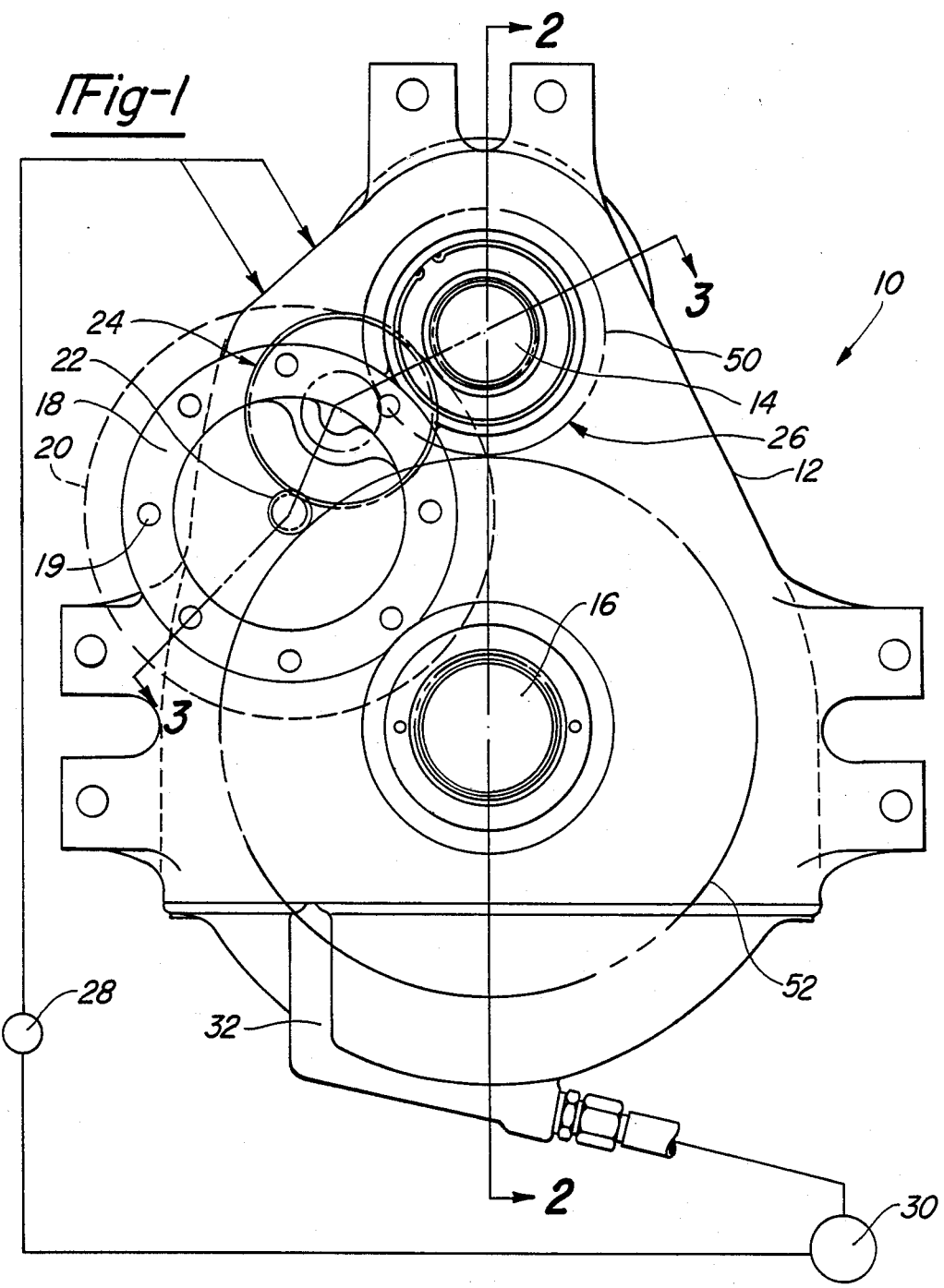
FIG. 1 is a rear view of a gear box constructed in accordance with the present invention.

Referring first for FIG. 1, a gear box 10 of the present invention is thereshown comprising a housing 12. The housing 12 includes means for rotatably supporting an input drive shaft 14 and means for rotatably supporting an output or driven shaft 16. Conventional bearings can be used as the means for rotatably supporting the shaft in the housing. The housing 12 also includes a mounting flange 18 and mounting bolts 19 adapted to receive a generator, indicated diagrammatically at 20 so as to position the rotor shaft 22 of the generator for engagement with a compound gear 24 to be described in greater detail hereinafter. A drive mechanism 26 connects the input shaft 14 to the output shaft 16 at one of two different rotary speeds as desired.

Figure 2:
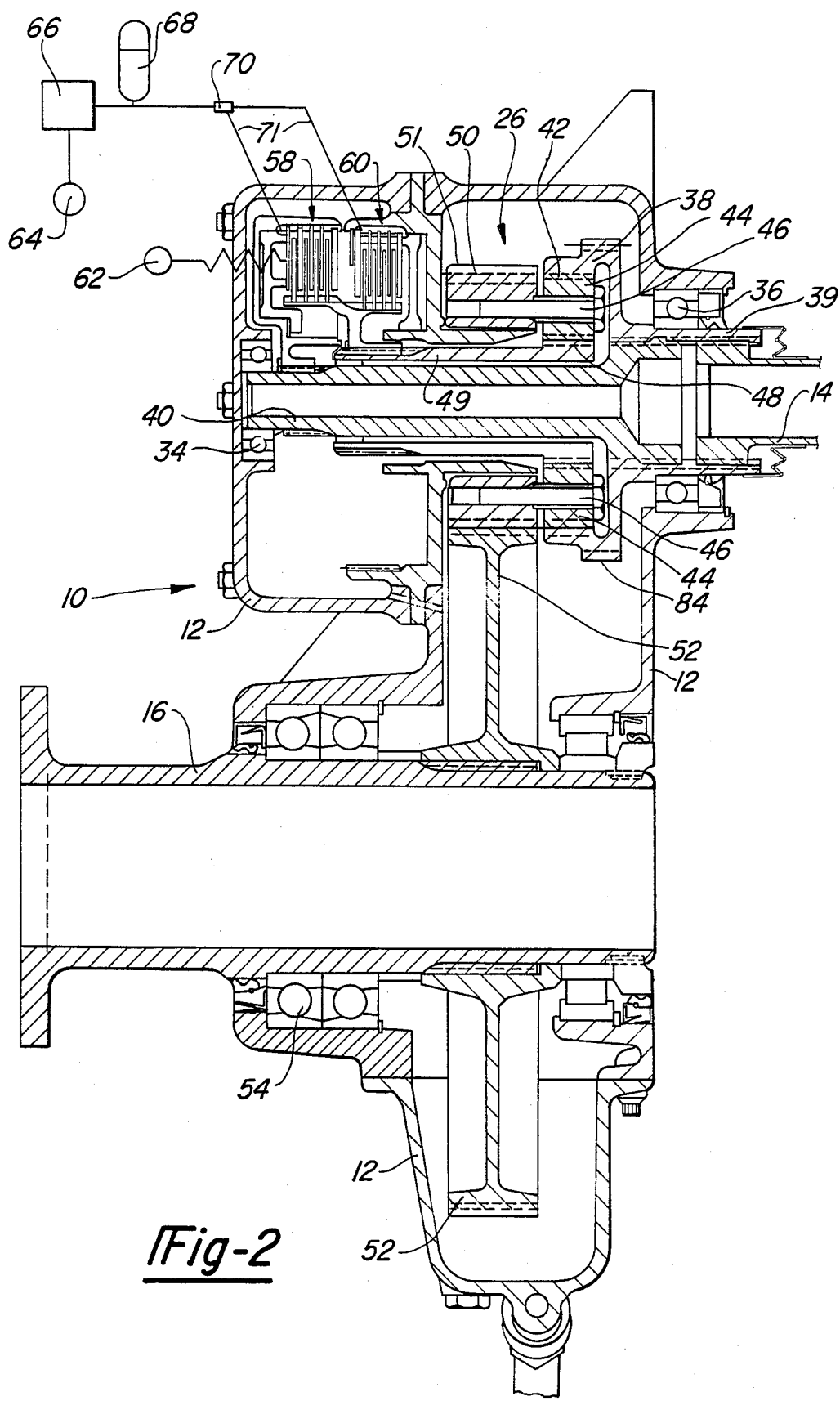
FIG. 2 is a sectional view taken substantially along the line 2—3 in FIG. 1.

Referring now to FIG. 2, the drive mechanism 26 is thereshown connecting the input shaft 14 with the output shaft 16 for two speed operation. The shaft 14 is rotatably supported by bearings 34 and 36 supported by the housing. An annulus gear 38 is engaged with the shaft 14 for rotation therewith, for example by a collar 39 spline fitted to the shaft 14. The collar 39 also provides means for connecting an internal shaft 40 for coaxial rotation with the input shaft 14. The annulus gear 38 includes a toothed gear rack 42 facing radially inwardly. The gear rack 42 engages the peripheries of a plurality of planet gears 44, each planet gear 44 rotating about a spindle 46. Each planet gear also engages a sun gear 48 coaxially positioned about the internal shaft 40.

A carrier connecting the axes or spindles 46 of the planet gears 44 is advantageously constructed in the form of a pinion gear 50. The pinion gear 50 forms the input of the second stage of the drive mechanism 26 and rotates at the speed with which the spindles 46 rotate about the input shaft 14. Gear teeth 51 of the pinion gear 50 extend circumferentially outwardly to engage a spur gear 52 mounted on the output shaft 16. The output shaft 16 is rotatably supported in the housing 12 by bearings 54.

The gear box housing 12 also includes a high gear clutch 58 and a low gear brake 60, respectively. The high gear clutch 58, when actuated, locks the sun gear 48 to the internal shaft 40 for rotation with the input annulus 38. This is accomplished by hydraulically locking interspersed clutch plates which are attached to the internal shaft 40 and a sleeve 49 integral with the sun gear 48, while sumultaneously disengaging the low gear brake 60. Conversely, actuation of the low gear brake 60 locks the sun gear 48 with respect to the housing 12 so that the sun gear 48 cannot rotate about the input shaft 14 while disengaging the high gear clutch 58. Both clutch 58 and brake 60 are actuated by high pressure hydraulic fluid in a well known manner, which will not be described in detail.

However, the present invention employs a novel source of high pressure fluid unlike the previously known continuously operated fluid pumps. The high pressure fluid used to actuate the clutches is amplified from a source of low pressure fluid such as lubricating and cooling oil returned to a reservoir. A low pressure source 64, shown diagrammatically in FIG. 2, is fluidly coupled to a hydraulic pressure amplifier 66. The amplifier may be of any suitable type such as a servo valve. The amplifier 66 utilizes a slide spool connected to a piston to supply high pressure fluid to an accumulator 68 where it is stored until movement of a slide valve 70 which permits discharge of the high pressure fluid to the fluid passage means 71 coupled to the clutch 58 and brake 60. When the accumulator 68 has been filled to a predetermined pressure, the amplifier 66 automatically terminates operation to avoid a continuous power drain on the means, such as an accessory drive, used to power the amplifier.

In the preferred embodiment, the high gear clutch 58 is normally held in an actuated position by means of a spring biasing mechanism shown diagrammatically at 62. Thus, the fluid passage means 71 simultaneously supplies high pressure fluid to both the high gear clutch 58 and low gear brake 60 to deactuate the clutch 58 as it actuates the brake 60. In such a system, it will be understood that the absence of hydraulic fluid pressure at the brake 60 and clutch 58 will automatically cause the gear box 10 to drive the output shaft 16 in high gear.

Specifically, when no high pressure fluid is delivered via passage means 71 to the clutch 58 and brake 60, a spring biasingly 62 locks the high gear clutch plates, thus engaging the internal shaft 40 to the sleeve 49 of the sun gear 48. This causes the sun gear 48 and the annulus gear 38 to rotate together, resulting in a speed ratio of 1.0 between the input shaft 14 and the carrier pinion 50. Conversely, when high pressure fluid is delivered to the clutch 58 and brake 60, the sleeve 49 of the sun gear 48 is locked to the housing 12 and remains stationary. In this instance, the planet gears 44 interact with the gear rack 42 and the sun gear 48, and the carrier pinion 50 is driven at low gear.

The low pressure source 64 can be provided by any readily available source of fluid such as a cooling or lubricating system of the engine. Although a pressure amplifier 66 is typically less efficient than a pressure pump, it does not require any input power after the accumulator 68 has been filled. As a result, when shifting of gears is infrequent, the accumulator 68 will be filled most of the time, and the amplifier 66 will remain inactive. Consequently, in aircraft applications where shifting is infrequent, the clutch actuation system for the gear box 10 of the present invention ultimately causes less power drain than the previously known high pressure pumps.

Figure 3:
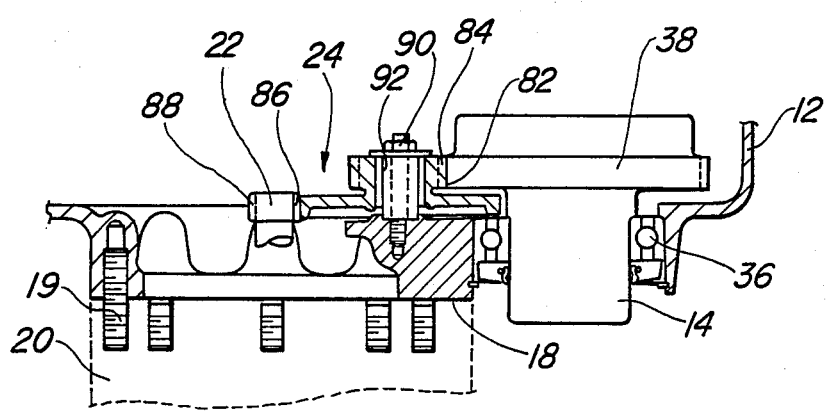
FIG. 3 is a sectional view taken substantially along the line 3—3 in FIG. 1.

Referring now to FIG. 3, the generator drive mechanism is thereshown comprising a compound gear 24. A first axial gear of the compound gear 24 includes gear teeth 82 adapted to engage teeth 84 on the annulus gear 38. A second axial gear of the compound gear 24 includes gear teeth 86 adapted to engage teeth 88 on the generator motor shaft 22. The compound gear 24 is rotatably supported about an anchor bolt 90 by a bushing 92. Since the compound gear 24 derives its power directly from the input annulus gear 38, it will be understood that, regardless of the speed with which the carrier pinion 20 is driven, the generator 20 will be driven at a constant speed dependent upon the gear ratios resulting from engagement of the gear teeth 84, 82, 86 and 88. Preferably, the teeth 88 are formed as a part of the shaft 22, rather than as a separate gear.

Referring again to FIG. 1, it will be understood that fluid, such as oil, is introduced at relatively high pressure to lubricate and cool the gear mechanism of generator 20 as well as the gears of the gear box 10 and other accessories. In the preferred embodiment, the gear box 10 and the generator 20 require an oil flow of approximately three gallons per minute for heat removal and lubrication. An oil pump shown diagrammatically at 28 provides the required high pressure oil from a supply of oil maintained in a reservoir 30. The pump 28 may be powered as an accessory to the gear box 10 or by the driving engine. Oil returns to the reservoir 30 via appropriate conduits aided by an ejector 32, rather than a scavenge pump. The ejector is powered by the oil which has passed through the generator cooling circuit. Preferably, the oil used to lubricate and cool the gear box 10 is the same oil from the same reservoir employed by the engine which the gear box 10 is attached.

Since the loss of fluid pressure across certain accessories, namely the generator 20, is relatively small, the generator cooling oil constitutes a source of relatively high pressure fluid. The ejector 32 utilizes the high pressure of the generator oil and the well known venturi effect to scavenge oil from the gear box 10 back to the reservoir 30. Ejectors utilize a high pressure stream to create a vacuum in a secondary conduit in a manner well known in the art which will not be described in detail. By using an ejector 32, the need for a dedicated scavenge pump is eliminated, and the additional weight and power drain of a pump is avoided.

Thus, the present invention provides a gear box 10 which is substantially lighter and more compact than previously known variable speed gear boxes. The gear box 10 advantageously eliminates the need for a power driven, hydraulic pump to operate the hydraulic clutch and brakes by substituting a hydraulic amplifier and an accumulator which consume less energy when shifting is infrequent. Similarly, a scavenging pump can be eliminated by employing an ejector which utilizes high pressure fluid from the generator circuit, to scavenge oil back to the reservoir.

Having thus described my invention, many modifications thereto will become apparent to those skilled in the art to which it pertains without departing from the scope and spirit of the present invention as defined in the appended claims.

I claim:

1. A gear box comprising:
   a housing;
   a drive shaft rotatably supported in said housing;
   an output shaft rotatably supported in said housing;
   planetary gear means including an annular gear mounted for rotation with said drive shaft and having a radially inwardly facing gear ring, a plurality of planet gears engaged with said gear ring, a sun gear supported coaxially with said drive shaft and engaged with said planet gears, and an annular planetary gear carrier having an inner circumferential surface and an outer circumferential surface, said surfaces being concentric, axially overlapping and in radial alignment relative to an axis of said drive shaft, said inner circumferential surface being adapted to freely rotate about said sun gear, said outer circumferential surface having a plurality of gear teeth, said gear carrier having a plurality of spindles for rotatably supporting said plurality of planet gears;
   a second gear mounted for rotation with said output shaft, said second gear being in engagement with said plurality of teeth of said gear carrier whereby said output shaft is driven when said gear carrier rotates; and
   means for selecting one of at least two output rotational speeds including brake means for selectively preventing rotation of said sun gear, clutch means for selectively locking said sun gear to said drive shaft for rotation therewith, and means for selectively actuating said brake means and said clutch means.

2. The gear box as defined in claim 1 wherein each of said brake means and clutch means includes a hydraulicly operated device and wherein said clutch actuating means comprises means for delivering a supply of high pressure fluid to at least one of said brake and clutch means.

3. A gear box comprising:
   a housing;
   a drive shaft rotatably supported in said housing;
   an output shaft rotatably supported in said housing;
   planetary gear means including an annular gear mounted for rotation with said drive shaft and having a radially inwardly facing gear ring, a plurality of planet gears engaged with said gear ring, a sun gear supported coaxially with said drive shaft and engaged with said planet gears, and an annular planetary gear carrier having an inner circumferential surface and an outer circumferential surface, said inner circumferential surface being adapted to freely rotate about said sun gear, said outer circumferential surface having a plurality of gear teeth, said gear carrier having a plurality of spindles for rotatably supporting said plurality of planet gears;
   a second gear mounted for rotation with said output shaft, said second gear being in engagement with said plurality of teeth of said gear carrier whereby said output shaft is driven when said gear carrier rotates;
   means for selecting one of at least two output rotational speeds including brake means for selectively preventing rotation of said sun gear, clutch means for selectively locking said sun gear to said drive shaft for rotation therewith, and means for selectively actuating said brake means and said clutch means;
   each of said brake means and clutch means including a hydraulically operated device and wherein said clutch actuating means comprises means for delivering a supply of high pressure fluid to at least one of said brake and clutch means;
   said delivery means comprising a hydraulic amplifier for generating a high pressure fluid from a low pressure source, and accumulator means for storing said high pressure fluid until delivery.

4. The gear box as defined in claim 3 wherein said means for selectively actuating said brake means and clutch means further comprises a switch means for selectively coupling said accumulator means with said hydraulic device of each said brake means and clutch means, for delivery of high pressure fluid.

5. The gear box as defined in claim 4, wherein said clutch means includes means for resiliently biasing said hydrualic device to its actuated condition and further comprising fluid passage means for delivering said high pressure fluid to both said brake means and clutch means so that said clutch means is deactivated as said brake means is actuated.

6. The gear box as defined in claim 1 and comprising means for supplying fluid under pressure to the gear box housing and passive means for returning said fluid from said housing to a reservoir.

7. The gear box as defined in claim 6 wherein said means for supplying comprises an accessory pump which pumps fluid from said reservoir to said housing.

8. The gear box as defined in claim 7 and comprising an engine to which said gear box is attached, said fluid comprising engine oil and said reservoir comprising an oil reservoir for the engine.

9. The gear box as defined in claim 6 wherein said passive means for returning said fluid comprises an ejector.

10. The gear box as defined in claim 6 wherein said fluid comprises a lubricant fluid.

11. The gear box as defined in claim 6 wherein said fluid comprises a coolant fluid.

12. The invention as defined in claim 1 and further comprising third gear means for driving an accessory in response to rotation of said drive shaft,
 a generator having a rotor shaft extending outwardly from its housing,
 and means for mounting said generator on said housing so that said rotor shaft is aligned for engagement with said third gear means.

13. The invention as defined in claim 12 wherein said third gear means comprises a radially outwardly facing gear rack on the radially outermost surface of said annular gear.

14. A gear box comprising:
 a housing;
 a drive shaft rotatably supported in said housing;
 an output shaft rotatably supported in said housing;
 planetary gear means including an annular gear mounted for rotation with said drive shaft and having a radially inwardly facing gear ring, a plurality of planet gears engaged with said gear ring, a sun gear supported coaxially with said drive shaft and engaged with said planet gears, and an annular planetary gear carrier having an inner circumferential surface and an outer circumferential surface, said inner circumferential surface being adapted to freely rotate about said sun gear, said outer circumferential surface having a plurality of gear teeth, said gear carrier having a plurality of spindles for rotatably supporting said plurality of planet gears;
 a second gear mounted for rotation with said output shaft, said second gear being in engagement with said plurality of teeth of said gear carrier whereby said output shaft is driven when said gear carrier rotates;
 means for selecting one of at least two output rotational speeds including brake means for selectively preventing rotation of said sun gear, clutch means for selectively locking said sun gear to said drive shaft for rotation therewith, and means for selectively actuating said brake means and said clutch means;
 means for supplying fluid under pressure to the gear box housing and passive means for returning said fluid from said housing to a reservoir;
 said passive means for returning said fluid comprising an ejector;
 said means for supplying fluid under pressure also supplies fluid to an accessory driven by said gear box, and wherein the pressure loss of fluid supplied to said accessory is less than the pressure loss of fluid supplied to said housing so that fluid supplied to said accessory powers said ejector to return fluid from the housing to the reservoir.

15. The gear box as defined in claim 14 wherein said accessory comprises a generator mounted to said gear box and driven by a third gear means adapted to engage a rotor shaft of the generator and a radially outwardly facing gear ring on the periphery of the annular gear.

* * * * *